(12) United States Patent
Medappa et al.

(10) Patent No.: US 11,140,131 B2
(45) Date of Patent: Oct. 5, 2021

(54) APPLICATION SIGNATURE AUTHORIZATION

(71) Applicant: SonicWALL US Holdings Inc., Milpitas, CA (US)

(72) Inventors: Chemira Medappa, Virajpet (IN); Christopher D. Peterson, Bellingham, WA (US); David Telehowski, Pacific Palisades, CA (US)

(73) Assignee: SONICWALL INC., Milpitas, CA (US)

( * ) Notice: Subject to any disclaimer, the term of this patent is extended or adjusted under 35 U.S.C. 154(b) by 135 days.

(21) Appl. No.: 16/533,665

(22) Filed: Aug. 6, 2019

(65) Prior Publication Data
US 2020/0053051 A1 Feb. 13, 2020

Related U.S. Application Data

(63) Continuation of application No. 14/319,145, filed on Jun. 30, 2014, now Pat. No. 10,382,398.

(60) Provisional application No. 61/973,248, filed on Mar. 31, 2014.

(51) Int. Cl.
| | |
|---|---|
| *H04L 29/06* | (2006.01) |
| *H04W 12/08* | (2021.01) |
| *H04W 12/37* | (2021.01) |
| *H04L 29/08* | (2006.01) |

(52) U.S. Cl.
CPC ...... *H04L 63/0263* (2013.01); *H04L 63/0272* (2013.01); *H04L 63/083* (2013.01); *H04L 63/105* (2013.01); *H04L 63/20* (2013.01); *H04W 12/08* (2013.01); *H04W 12/37* (2021.01); *H04L 67/141* (2013.01)

(58) Field of Classification Search
None
See application file for complete search history.

(56) References Cited

U.S. PATENT DOCUMENTS

| | | | |
|---|---|---|---|
| 6,963,740 | B1 | 11/2005 | Guthery et al. |
| 7,155,512 | B2 | 12/2006 | Lean et al. |
| 7,353,533 | B2 | 4/2008 | Wright et al. |
| 7,448,080 | B2 | 11/2008 | Karjala et al. |
| 7,478,420 | B2 | 1/2009 | Wright et al. |
| 7,617,541 | B2 | 11/2009 | Plotkin et al. |
| 7,815,100 | B2 | 10/2010 | Adams et al. |
| 7,917,963 | B2 | 3/2011 | Goyal et al. |
| 8,589,541 | B2 | 11/2013 | Raleigh et al. |

(Continued)

OTHER PUBLICATIONS

U.S. Appl. No. 14/319,166 Office Action dated Feb. 25, 2019.

(Continued)

*Primary Examiner* — William J. Goodchild
(74) *Attorney, Agent, or Firm* — Polsinelli LLP

(57) ABSTRACT

An appliance works in conjunction with an agent on a remote device to control application access to a corporate network. In conjunction with an SSL tunnel and policy operating at the appliance, granular application control may be implemented. In particular, a device user may determine what applications from a set of applications may access the corporate network and which applications do not access the network. The applications may be analyzed to determine whether the application is good or bad, as what security configurations, approvals and denials are associated with the application.

20 Claims, 5 Drawing Sheets

(56) References Cited

U.S. PATENT DOCUMENTS

| | | |
|---|---|---|
| 10,382,398 B2 | 8/2019 | Medappa |
| 2001/0037406 A1 | 11/2001 | Philbrick et al. |
| 2002/0129271 A1 | 9/2002 | Stanaway et al. |
| 2003/0229786 A1* | 12/2003 | Hollis ............ H04L 63/0442 713/168 |
| 2004/0186864 A1 | 9/2004 | Hsu et al. |
| 2004/0268148 A1 | 12/2004 | Karjala et al. |
| 2005/0183143 A1 | 8/2005 | Anderholm et al. |
| 2007/0220511 A1 | 9/2007 | Clarke et al. |
| 2008/0052395 A1 | 2/2008 | Wright et al. |
| 2008/0109679 A1 | 5/2008 | Wright et al. |
| 2008/0263632 A1* | 10/2008 | Keon ............... H04L 12/2854 726/3 |
| 2008/0313186 A1 | 12/2008 | Marsh |
| 2009/0061863 A1* | 3/2009 | Huggett ............ H04W 12/08 455/434 |
| 2010/0118030 A1 | 5/2010 | Helfman et al. |
| 2011/0191196 A1 | 8/2011 | Orr et al. |
| 2012/0167162 A1 | 6/2012 | Raleigh et al. |
| 2012/0331563 A1 | 12/2012 | Chaudhury et al. |
| 2013/0227683 A1 | 8/2013 | Bettini et al. |
| 2013/0247147 A1 | 9/2013 | Pontillo et al. |
| 2013/0254889 A1 | 9/2013 | Stuntebeck |
| 2013/0298185 A1 | 11/2013 | Koneru et al. |
| 2013/0336284 A1 | 12/2013 | Hiscock et al. |
| 2014/0007222 A1 | 1/2014 | Qureshi et al. |
| 2014/0032691 A1 | 1/2014 | Barton et al. |
| 2014/0207950 A1 | 7/2014 | Badiee et al. |
| 2014/0259178 A1 | 9/2014 | Karaa et al. |
| 2014/0289528 A1* | 9/2014 | Baghdasaryan ........ G06F 21/32 713/171 |
| 2015/0020148 A1 | 1/2015 | Greenbaum et al. |
| 2015/0059006 A1 | 2/2015 | White |
| 2015/0281003 A1 | 10/2015 | Peterson |
| 2015/0281281 A1 | 10/2015 | Peterson |
| 2015/0281282 A1 | 10/2015 | Medappa |

OTHER PUBLICATIONS

U.S. Appl. No. 14/319,166 Final Office Action dated Aug. 10, 2018.
U.S. Appl. No. 14/319,166 Office Action dated Jan. 22, 2018.
U.S. Appl. No. 14/319,166 Final Office Action dated Oct. 11, 2017.
U.S. Appl. No. 14/319,166 Office Action dated Mar. 16, 2017.
U.S. Appl. No. 14/319,145 Final Office Action dated Jun. 13, 2016.
U.S. Appl. No. 14/319,145 Office Action dated Oct, 15, 2015.
U.S. Appl. No. 14/319,136 Final Office Action dated Jun. 21, 2019.
U.S. Appl. No. 14/319,136 Office Action dated Jan. 2, 2019.
U.S. Appl. No. 14/319,136 Final Office Action dated Nov. 28, 2017.
U.S. Appl. No. 14/319,136 Office Action dated Jun. 15, 2017.
U.S. Appl. No. 14/319,136 Final Office Action dated Feb. 15, 2017.
U.S. Appl. No. 14/319,136 Office Action dated Oct. 6, 2016.
U.S. Appl. No. 14/319,136 Final Office Action dated Jun. 15, 2016.
U.S. Appl. No. 14/319,136 Office Action dated Oct. 8, 2015.

* cited by examiner

APPLICATION SIGNATURE AUTHORIZATION

CROSS-REFERENCE TO RELATED APPLICATIONS

This application is a continuation and claims the priority benefit of U.S. patent application Ser. No. 14/319,145 filed Jun. 30, 2014, now U.S. Pat. No. 10,382,398, which claims the priority benefit of provisional application No. 61/973,248, filed Mar. 31, 2014, the disclosures of which are incorporated herein by reference.

BACKGROUND OF THE INVENTION

Consumers continue to push for a mechanism that allows them to use their own device to perform typical work tasks. In most cases, these devices are owned by the individual user, which means the company may have zero control over them. Because companies have little if any control over these user devices, there is concern regarding providing the device access to corporate remote networks due to the potential for attacks vectors (nefarious applications, leaking, tampering, or otherwise disclosing of critical intellectual property owned by company). The market has coined the term "unmanaged device" or "BYOD" (bring your own device) to represent any device that is not owned or controlled by the company that needs access to the corporate network so the employee can do their work. In most cases, this device is owned by the employee requesting access. Some companies require employee devices to be put under mobile device management (MDM) control before allowed onto the corporate network, but such a configuration is not really zero control.

Most mobile solutions are all or nothing—all data is shared or no data is shared with respect to a corporate intranet (i.e., an appliance based network). With the advent of BYOD, users need to access the corporate intranet but do not want their personal information to be available to the corporate intranet. Likewise, the corporate intranet may not want to risk exposure to certain content on the user device that is not germane (or appropriate) for the corporate network.

Secure communication with a corporate network can be achieved through virtual private network (VPN) connections. Current VPN clients that provide application level control block traffic in that VPN application running on the client device. For example, some companies provide a per-app VPN solution. Despite current VPN per application solutions, there are still concerns regarding the vulnerability of corporate network access from personal user devices.

There is a need in the art for managing access to corporate networks by user's personal devices that identifies the health of applications granted access to the network.

SUMMARY OF THE CLAIMED INVENTION

An appliance works in conjunction with an agent on a remote device to control application access to a corporate network. In conjunction with an SSL tunnel and policy operating at the appliance, granular application control may be implemented. In particular, a device user may determine what applications from a set of applications may access the corporate network and which applications do not access the network. The applications may be analyzed to determine whether the application is good or bad, as what security configurations, approvals and denials are associated with the application.

An embodiment may include a method for establishing a connection. The method may include establishing a connection between a user client device and a server, the user client device having a plurality of applications. Application information derived from the application may be received for one of the plurality of applications from the user client device. Traffic may be processed for the application of the plurality of applications based on the application information derived from the application.

In an embodiment, a system for establishing a connection may include a server in communication with a user client device. The server may include a processor, memory, and one or more applications stored in memory at the server and executable by the processor to establish a connection between a user client device and a server, the user client device having a plurality of applications, receive application information derived from the application for one of the plurality of applications from the user client device, and process traffic for the application of the plurality of applications based on the application information derived from the application.

DETAILED DESCRIPTION

An appliance works in conjunction with an agent on a remote device to control application access to a corporate network. In conjunction with an SSL tunnel and policy operating at the appliance, granular application control may be implemented. In particular, a device user may determine what applications from a set of applications may access the corporate network and which applications do not access the network. The applications may be analyzed to determine whether the application is good or bad, as what security configurations, approvals and denials are associated with the application.

Consumers continue to push for a mechanism that allows them to use their own device to perform typical work tasks. In most cases, these devices are owned by the individual user, which means the company may have zero control over them. Because companies have little if any control over these user devices, there is concern regarding providing the device access to corporate remote networks due to the potential for attacks vectors (nefarious applications, leaking, tampering, or otherwise disclosing of critical intellectual property owned by company). The market has coined the term "unmanaged device" or "BYOD" (bring your own device) to represent any device that is not owned or controlled by the company that needs access to the corporate network so the employee can do their work. In most cases, this device is owned by the employee requesting access. Some companies require employee devices to be put under mobile device management (MDM) control before allowed onto the corporate network, but such a configuration is not really zero control.

Most mobile solutions are all or nothing—all data is shared or no data is shared with respect to a corporate intranet (i.e., an appliance based network). With the advent of BYOD, users need to access the corporate intranet but do not want their personal information to be available to the corporate intranet. Likewise, the corporate intranet may not want to risk exposure to certain content on the user device that is not germane (or appropriate) for the corporate network.

Secure communication with a corporate network can be achieved through virtual private network (VPN) connections. Current VPN clients that provide application level control block traffic in that VPN application running on the client device. For example, some companies provide a per-app VPN solution. Despite current VPN per application solutions, there are still concerns regarding the vulnerability of corporate network access from personal user devices.

Figure 1:
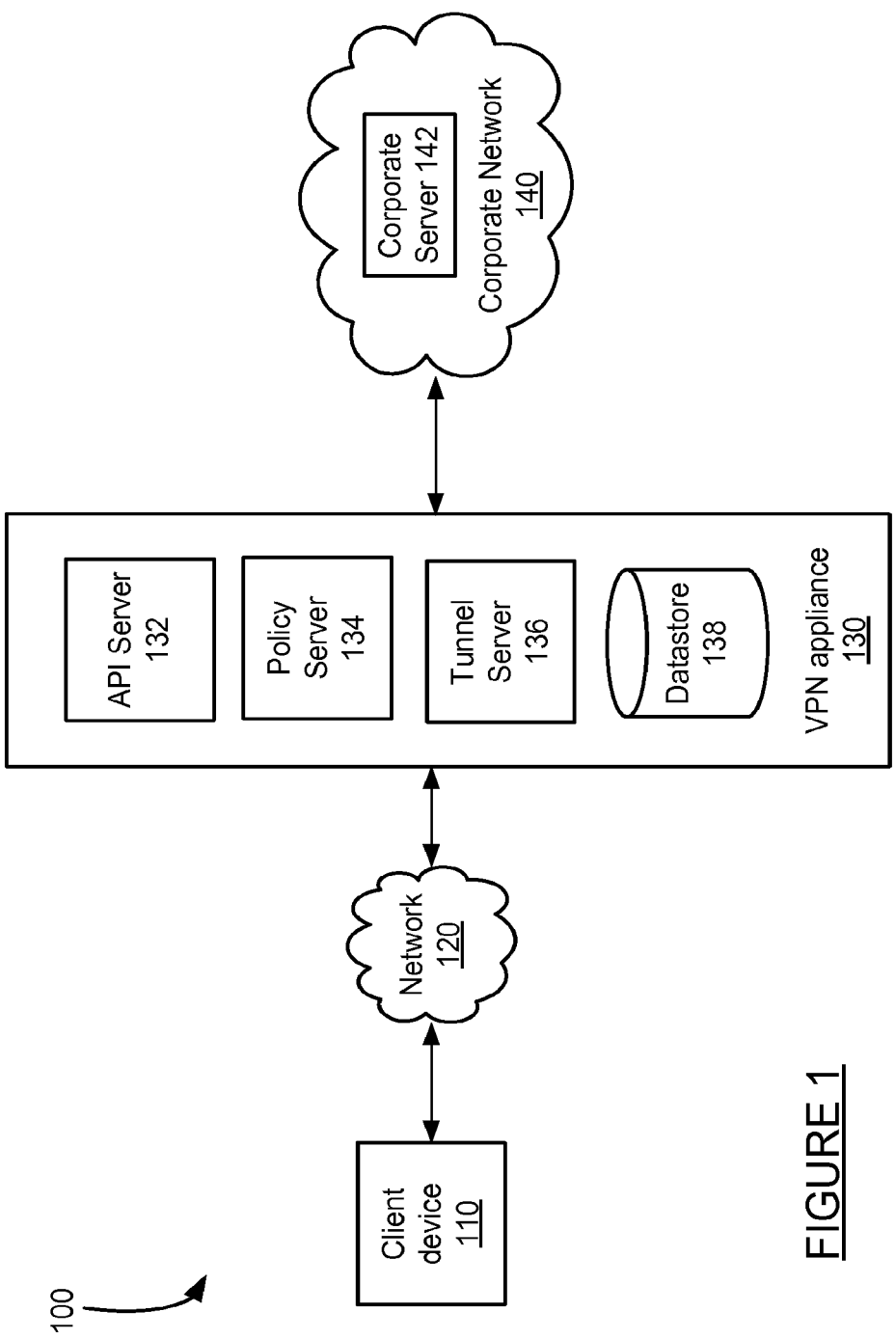
FIG. 1 illustrates a block diagram of a client communicating with a remote server.
Figure 2:
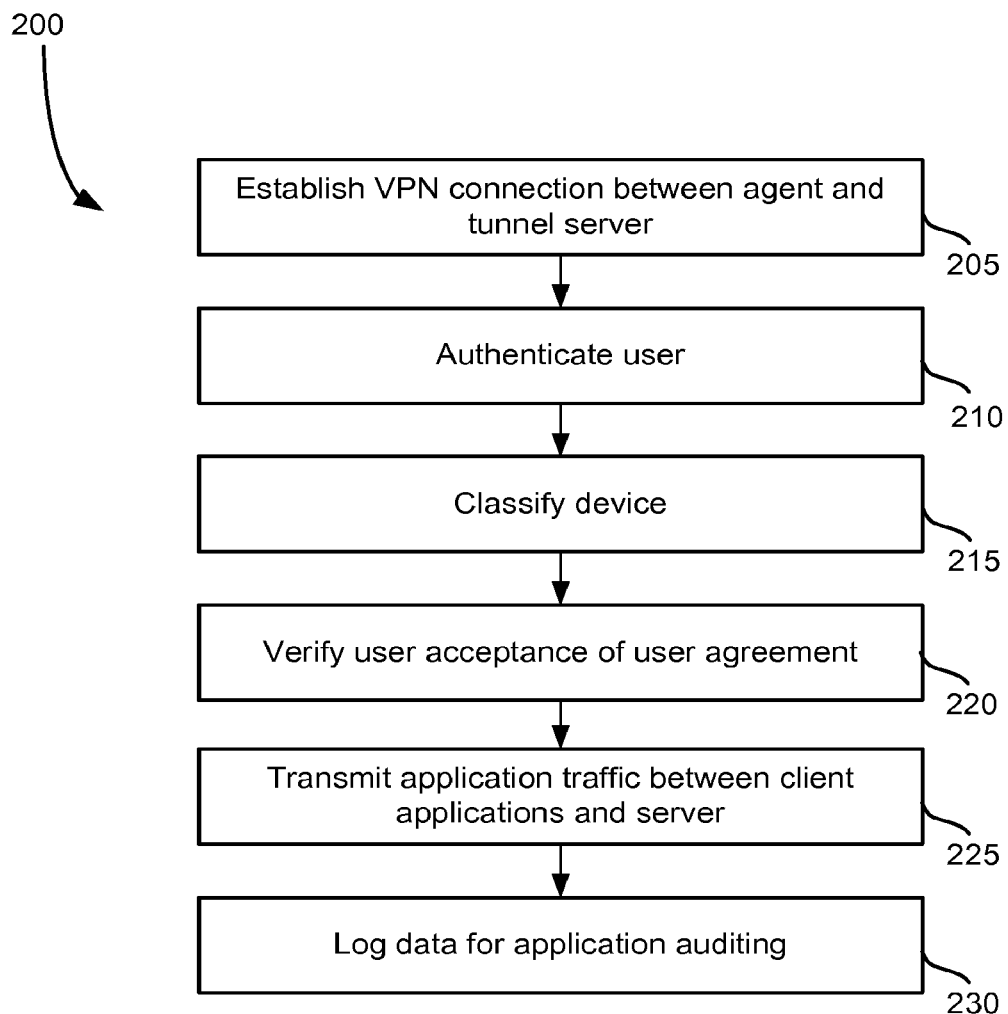
FIG. 2 illustrates a block diagram of a client having an agent.

FIG. 2 illustrates a method for providing application access to a network. A VPN connection is established between the tunnel server and an agent 240 on the client at step 205. The agent may initiate the VPN establishment by sending a VPN request to the VPN appliance.

A user is authenticated at step 210. User authentication is performed to identify the user of the device. A user device is then classified to determine if it meets acceptable parameters at step 215. After the user authenticates, the system will attempt to verify the user's device verify the device. In some instances, an administrator defines a set of device attributes, and the system may attempt to find a set of attributes that match the device. Classification of the device may include retrieval of a unique equipment identifier along with other device attribute data. The unique equipment identifier and device attribute data may be collected by an agent and transmitted to policy server 134. The attribute data may be used by the policy server to determine if client device 110 may allow for application control by the policy server via the agent.

Once the user is authenticated and the device is classified, the data store is queried to determine if a matching entry for the user and device exist. If the user and device combination are found in the data store, then the user and device have established a connection with the corporate network before and the version of the user agreement previously agreed to by the user is checked against the most recent version. If the most recent user agreement has not changed from the stored user agreement for the user and device combination, then the present system does not provide the user with the same user agreement and a portion of or all of step 220 (and corresponding method of FIG. 4) will not per performed for the current session.

If the device requires a new user agreement to be accepted, either because the user and device combination is not found in the data store or the current version of the user agreement does not match the stored version of the user agreement, the method continues to step 220.

User acceptance of a user agreement is verified at step 220. Once a user accepts a user agreement, the user may be authorized for the corporate network access. In some embodiments, a policy server determines authorization of the user, device, and checks access permissions. The policy allows for application access to particular data for a particular device type and user type. Once the user has accepted the user agreement, the user may be authorized to access a corporate network.

Application traffic may be transmitted to the corporate network at step 225. An agent on the client device may monitor communication data and provide information to the user of the device regarding what applications are communicating with the corporate network.

Immediately before an application starts a new flow of communication with the VPN appliance, the agent running on the client device will communicate application identifying information to the VPN appliance; this information includes an application identifier as well as a code signature for that application. The code signature may be in the form of a hash. Generating a code signature and processing data associated with a code signature is discussed with respect to the method of FIG. 4.

An agent on the client device may monitor communication data and provide information to the user of the device regarding what applications are communicating with the corporate network. From this information, the user may determine if only authorized applications are communicating with the corporate network and if the authorized applications are communicating appropriately.

Data may be stored for application auditing or other purposes at step 230. Application communication with a server may be analyzed or audited at some point in time. By collecting data for the application communication with the server, a user may determine if the application is complying with any relevant policies or requirements. Storing data for subsequent auditing is discussed in more detail below with respect to FIG. 4.

Figure 3:
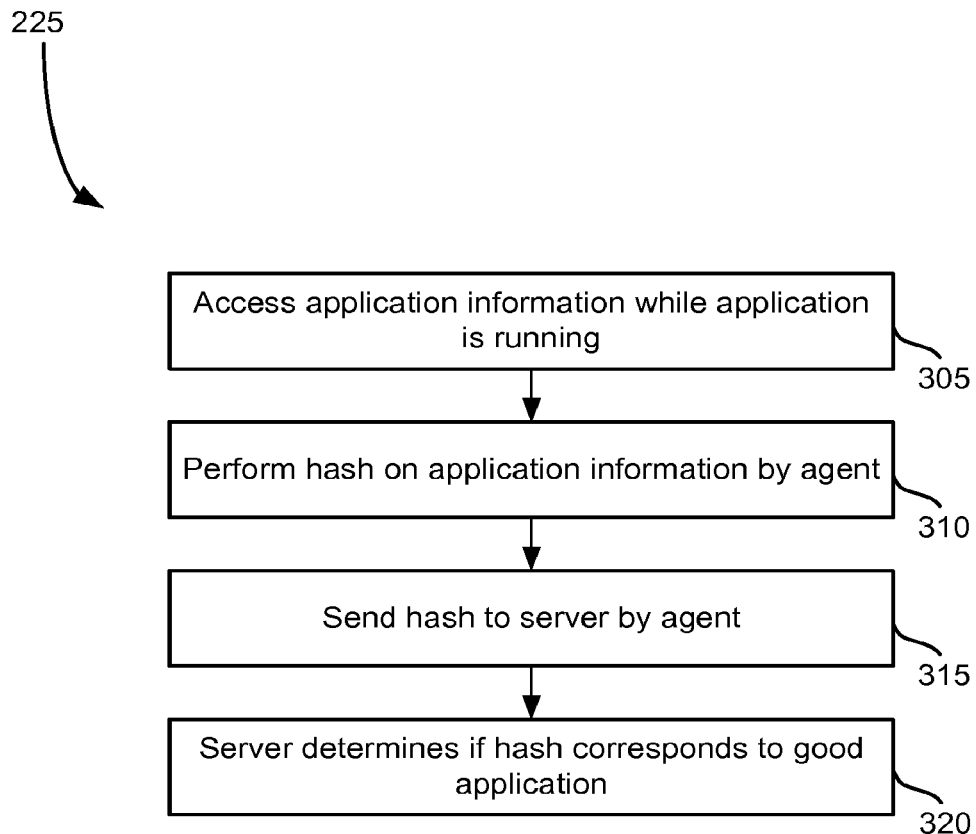
FIG. 3 illustrates a method for generating a code signature.

FIG. 3 illustrates a method for generating a code signature. Application information to be hashed is accessed at step 305. Information to be hashed may be accessed while the application is running or not running. The hash may be created from one or more of a binary of the application, application signature certificate, application identifier, and version. In some instances, the hash may use SHA-256 to compute: a hash of [hash of (Application Signature certificate)+hash of (AppID)+hash of (Version)].

The present code signature has a high degree of security in that the policy server doesn't provide the hash it is looking for to the client. It is very hard to guess the hash that will match the one stored at the VPN appliance. Additionally, the present system that is used to classify the users device into the proper policy set can determine if the client device is jail broken/rooted and the device can be prevented from the using the network at all. The methodology for generating the hash for the application may vary.

A hash may be performed on the application information by the agent at step 310. The hash may be performed in any of several ways known in the art. Once the application information is hashed, the hash is transmitted by the agent to the server at step 315.

The server receives the hash and determines if the hash corresponds to a good application at step 320. To determine if the application is a "good" application, the server may look up the hash in a table of hashes and corresponding application information identifying the application associated with the hash as an exact match or not. A good application may be one that is secure and authorized to communicate with a corporate network through a VPN handling traffic between a user device and the corporate network. If the hash does not correspond to a good application, traffic associated with the application may be denied. For example, if the binary hash is performed during application authentication, and the hash is determined to not be associated with a good application, an authentication request for the application may be denied. If the binary file hash is provided along with traffic to the tunnel server, the traffic may be blocked if the hash is determined to not correspond with a good application.

In some instances, if the server configuration requires hash matching, then the client agent will send the hash value along with the application identifier to the server. If the hash is expected and not provided the server will immediately deny the traffic.

In some instances, hash checking is optional, and the server may be configured to "allow any version" in which case no hash information is needed. With this configuration, the server will not verify any hash that is sent against values in the configuration. The choice to perform this hash verification can be configured per application and client platform. Hence, the server may be configured to require hashing for the application "Thunderbird" on Android platform, but not for the "Thunderbird" application on iOS platform.

Figure 4:
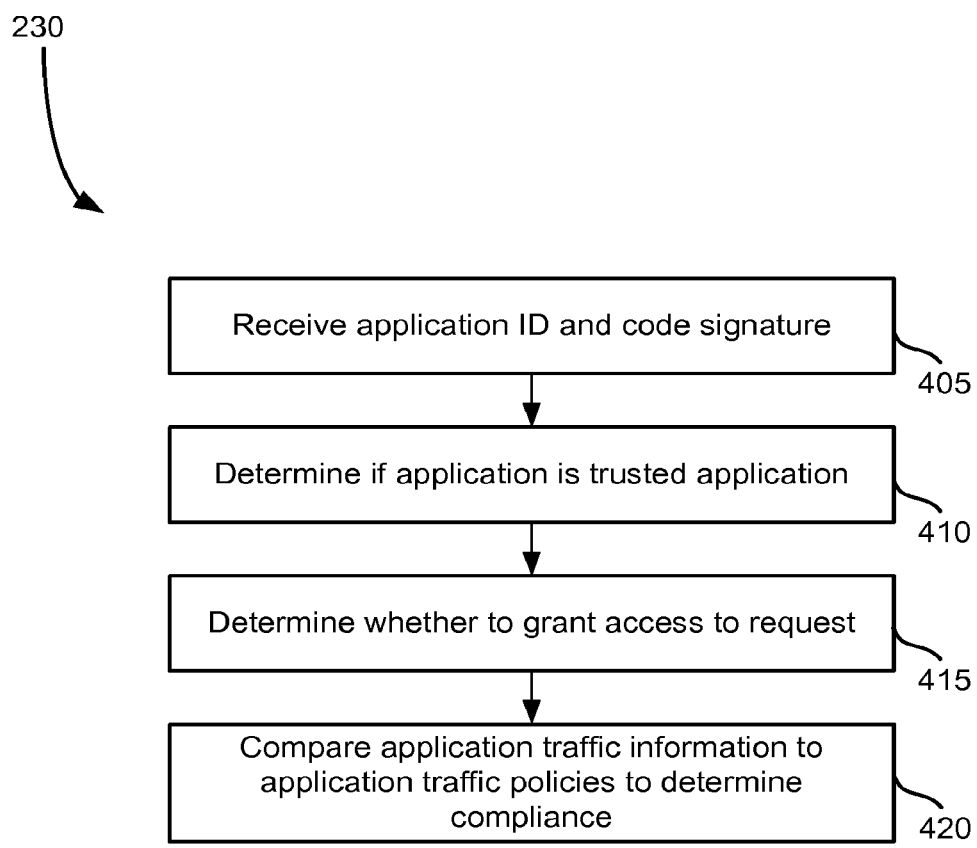
FIG. 4 illustrates a method for collecting application traffic data.

FIG. 4 illustrates a method for collecting application traffic data. An application identifier (e.g., "com.apple.safari") is sent by the agent on the client device to the VPN appliance with the code signature (e.g., hash value) at step 405. The combination of the application ID and the hash value may allow the VPN appliance to determine if an application is a valid and trusted version of a particular client application. In some instances, the application identifier and hash value are used to look-up a particular application in our policy rules for an access check.

A determination is made as to whether to grant the request from the application access at step 415. To make the determination, the VPN appliance adds the application identifier to the other standard flow attributes as well as information already known about the connection to determine if the request should be granted access. This information includes, but is not limited to: Application, User, device capabilities (zone), time of access, and network destination address and port.

All or part of application traffic information collected and/or accessed in steps 405-410 may be compared to application traffic policies to determine compliance at step 425. The policy rules are not visible to the users, they can only see the results of an access attempt, it works or it does not.

In some instances, in addition to identifying trusted applications as discussed above, the present system includes logic to help it learn how to identify trusted applications. A particular device identified can be placed on a trusted devices list based on its equipment identifier. If an access request is made from an application that does not match a known hash, but came from a trusted device on the trusted devices list, then the application identifier, version, and hash value will be stored in the datastore.

The administrator of the VPN appliance may access a list of all failed requests from trusted devices and may add them to the list of hash values that are acceptable for that application in the configuration. In some instances, a global flag on the appliance may be set to enable/disable application learning. If application learning is disabled, then trusted devices act exactly the same as normal devices.

In some instances, when a trusted device connects to the VPN appliance, the list of applications may include all applications that are configured for access on the VPN appliance. For normal untrusted devices, only those applications that the user can use in the current session context to access resources on the corporate network will be sent to the client for presentation to the user.

In some instances, when an inside application or application from one device tries to connect to another device, inverse communication occurs. In this instance, the system has the IP address:port where the application needs to connect to but needs to check if an authorized application is running on IP address:port on the client. In such case, tunnel protocol messages are sent to a mobile connect agent from the access gateway asking for application details of application listening on IP address:port. Mobile Connect agent will get a response of NOT_FOUND or the Application ID and digital signature back. This allows an access gateway to determine if the flow is going to an authorized application.

Figure 5:
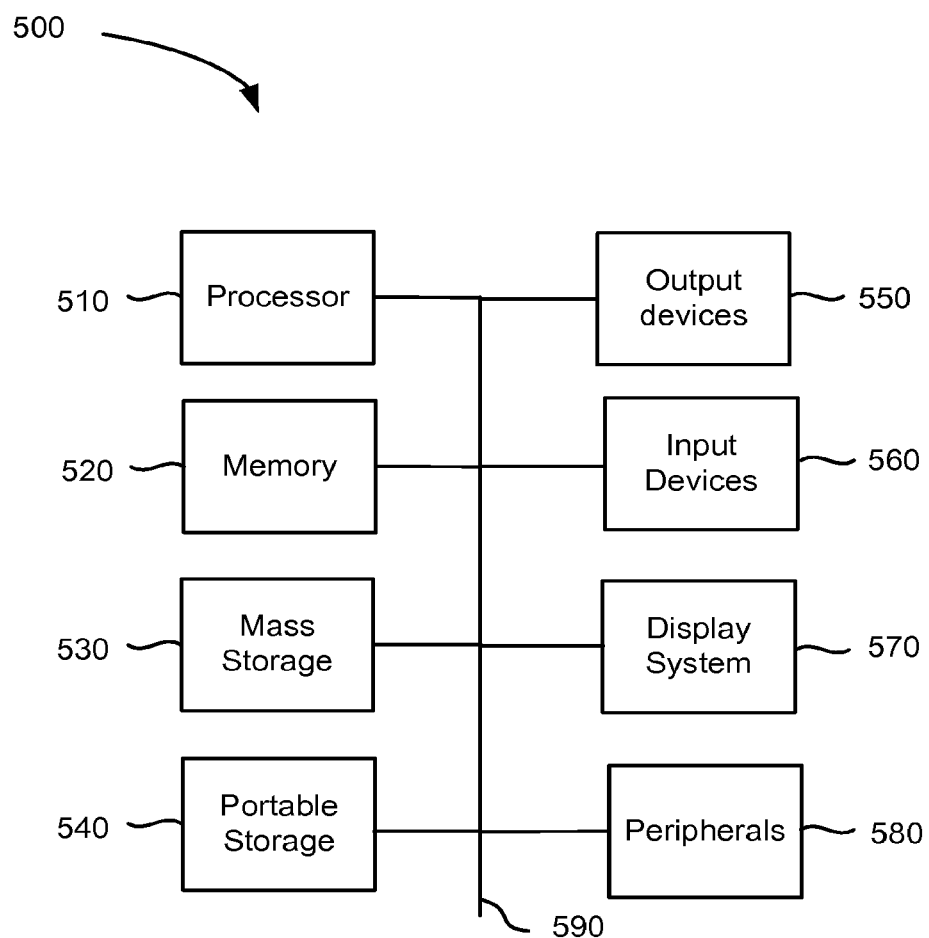
FIG. 5 is a block diagram of an exemplary system for implementing a computing device.

FIG. 5 is a block diagram of an exemplary system for implementing a computing device. System 500 of FIG. 5 may be implemented in the contexts of the likes of client device 110, VPN appliance 130 and corporate server 142. The computing system 500 of FIG. 5 includes one or more processors 510 and memory 520. Main memory 510 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, iOS, Android and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing access to a computer network, the method comprising:
storing information regarding one or more authorized applications in a data store of a computing device within the computer network;
receiving a signature of an application program sent from a trusted user device to the computing device;
identifying that the signature does not match the information stored in the data store of the computing device;
identifying that a learning mode is enabled for the trusted user device;
adding the signature to the stored information based on the learning mode being enabled for the trusted user device and based on the signature being received from the trusted user device;
identifying subsequent to adding the signature to the stored information that a later received signature matches the stored information in the data store; and
allowing information associated with the application program to be sent to one or more computers within the computer network responsive to the later received signature matching the stored information.

2. The method of claim 1, further comprising:
monitoring communications sent between the user device and the one or more computers; and
providing a list for presentation on a user interface of the user device, the list including one or more application programs that have communicated with the one or more computers.

3. The method of claim 1, further comprising receiving user authentication information sent from the user device to the computing device, and classifying the user device based on the received user authentication information from the user device.

4. The method of claim 3, further comprising receiving an equipment identifier at the computing device, wherein the classification of the user device is further based on the equipment identifier.

5. The method of claim 4, further comprising adding the user device to a list of trusted devices.

6. The method of claim 3, further comprising receiving a device attribute at the computing device, wherein the classification of the user device is further based on the device attribute.

7. The method of claim 1, wherein the signature is generated based on application certificate data.

8. The method of claim 1, wherein the signature is generated based on application program information.

9. The method of claim 1, further comprising:
sending a user agreement to the user device, wherein a user of the user device accepts the user agreement, and receiving an indication of the acceptance at the computing device.

10. A non-transitory computer-readable storage medium having embodied thereon a program executable by a processor to implement a method for managing access to a computer network, the method comprising:
storing information regarding one or more authorized applications in a data store of a computing device within the computer network;
receiving a signature of an application program sent from a trusted user device to the computing device;
identifying that the signature does not match the information stored in the data store of the computing device;
identifying that a learning mode is enabled for the trusted user device;
adding the signature to the stored information based on the learning mode being enabled for the trusted user device and based on the signature being received from the trusted user device;
identifying subsequent to adding the signature to the stored information that a later received signature matches the stored information in the data store; and
allowing information associated with the application program to be sent to one or more computers within the computer network responsive to the later received signature matching the stored information.

11. The non-transitory computer-readable storage medium of claim 10, the program further executable to:
monitor communications sent between the user device and the one or more computers; and
provide a list for presentation on a user interface of the user device, the list including one or more application programs that have communicated with the one or more computers.

12. The non-transitory computer-readable storage medium of claim 10, the program further executable to receive user authentication information sent from the user device to the computing device, and classifying the user device based on the received user authentication information from the user device.

13. The non-transitory computer-readable storage medium of claim 12, the program further executable to receive an equipment identifier at the computing device, wherein the classification of the user device is further based on the equipment identifier.

14. The non-transitory computer-readable storage medium of claim 13, further comprising adding the user device to a list of trusted devices.

15. The non-transitory computer-readable storage medium of claim 12, the program further executable to receive a device attribute at the computing device, wherein the classification of the user device is further based on the device attribute.

16. The non-transitory computer-readable storage medium of claim 10, wherein the signature is generated based on application certificate data.

17. The non-transitory computer-readable storage medium of claim 10, wherein the signature is generated based on application program information.

18. The non-transitory computer-readable storage medium of claim 10, the program further executable to:
send a user agreement to the user device, wherein a user of the user device accepts the user agreement, and
receive an indication of the acceptance at the computing device.

19. An apparatus for managing access to a computer network, the apparatus comprising:
a memory; and
a processor that executes instructions out of the memory to:
store information regarding one or more authorized applications in a data store of a computing device within the computer network,
receive a signature of an application program sent from a trusted user device to the computing device,
identify that the signature does not match the information stored in the data store of the computing device,
identify that a learning mode is enabled for the trusted user device,
add the signature to the stored information based on the learning mode being enabled for the trusted user device and based on the signature being received from the trusted user device,
identify subsequent to adding the signature to the stored information that a later received signature matches the stored information in the data store, and
allow information associated with the application program to be sent to one or more computers within the computer network responsive to the later received signature matching the stored information.

20. The apparatus of claim 19, further comprising a user interface, wherein the processor also executes instructions out of the memory to:
monitor communications sent between the user device and the one or more computers; and
provide a list for presentation on a user interface of the user device, the list including one or more application programs that have communicated with the one or more computers.

* * * * *